US008737679B2

(12) United States Patent
Subramanian et al.

(10) Patent No.: US 8,737,679 B2
(45) Date of Patent: May 27, 2014

(54) SYSTEM AND METHOD FOR SEAMLESS CONTENT INSERTION ON NETWORK CONTENT USING AUDIO-VIDEO FINGERPRINTING AND WATERMARKING

(75) Inventors: Baskar Subramanian, Bangalore (IN); Shashidhar Banger, Bangalore (IN)

(73) Assignee: M/S. Amagi Media Labs Pvt. Ltd., Bangalore (IN)

( * ) Notice: Subject to any disclaimer, the term of this patent is extended or adjusted under 35 U.S.C. 154(b) by 171 days.

(21) Appl. No.: 13/544,234

(22) Filed: Jul. 9, 2012

(65) Prior Publication Data

US 2013/0177199 A1 Jul. 11, 2013

Related U.S. Application Data

(60) Provisional application No. 61/506,853, filed on Jul. 12, 2011.

(51) Int. Cl.
*G06K 9/00* (2006.01)
(52) U.S. Cl.
USPC .............................. 382/100; 348/659; 713/176
(58) Field of Classification Search
USPC ............ 382/100, 232; 380/54, 210, 252, 287; 348/460, 463, 584, 598, 600, 659; 713/176; 704/200.1, 273
See application file for complete search history.

(56) References Cited

U.S. PATENT DOCUMENTS

| | | | | |
|---|---|---|---|---|
| 4,974,085 | A * | 11/1990 | Campbell et al. | 348/460 |
| 6,493,872 | B1 * | 12/2002 | Rangan et al. | 725/32 |
| 6,771,316 | B1 * | 8/2004 | Iggulden | 348/553 |
| 6,959,143 | B2 * | 10/2005 | Dupuis et al. | 386/250 |
| 8,020,000 | B2 * | 9/2011 | Oostveen et al. | 713/176 |
| 8,150,096 | B2 * | 4/2012 | Alattar | 382/100 |
| 8,639,178 | B2 * | 1/2014 | Anniballi et al. | 455/3.01 |
| 2003/0185417 | A1 * | 10/2003 | Alattar et al. | 382/100 |
| 2005/0015816 | A1 | 1/2005 | Christofalo | |
| 2006/0075449 | A1 | 4/2006 | Jagadeesan | |
| 2009/0265243 | A1 * | 10/2009 | Karassner et al. | 705/14.54 |
| 2012/0167133 | A1 * | 6/2012 | Carroll et al. | 725/32 |
| 2013/0031577 | A1 * | 1/2013 | Pixley | 725/32 |
| 2014/0037133 | A1 * | 2/2014 | Bateman | 382/100 |

FOREIGN PATENT DOCUMENTS

WO 2006097825 A2 9/2006

* cited by examiner

*Primary Examiner* — Anand Bhatnagar
(74) *Attorney, Agent, or Firm* — Laurence P. Colton; Smith Risley Tempel Santos LLC

(57) ABSTRACT

A system and method to extract audio-video fingerprint and embed an audio-video watermark onto a content asset that is transmitted as part of network content. The specific content to be replaced and the point of local content insertion are identified uniquely by looking for the embedded audio-video watermark and match the audio-video fingerprint. The identified point of insertion enables seamless local content insertion.

30 Claims, 8 Drawing Sheets

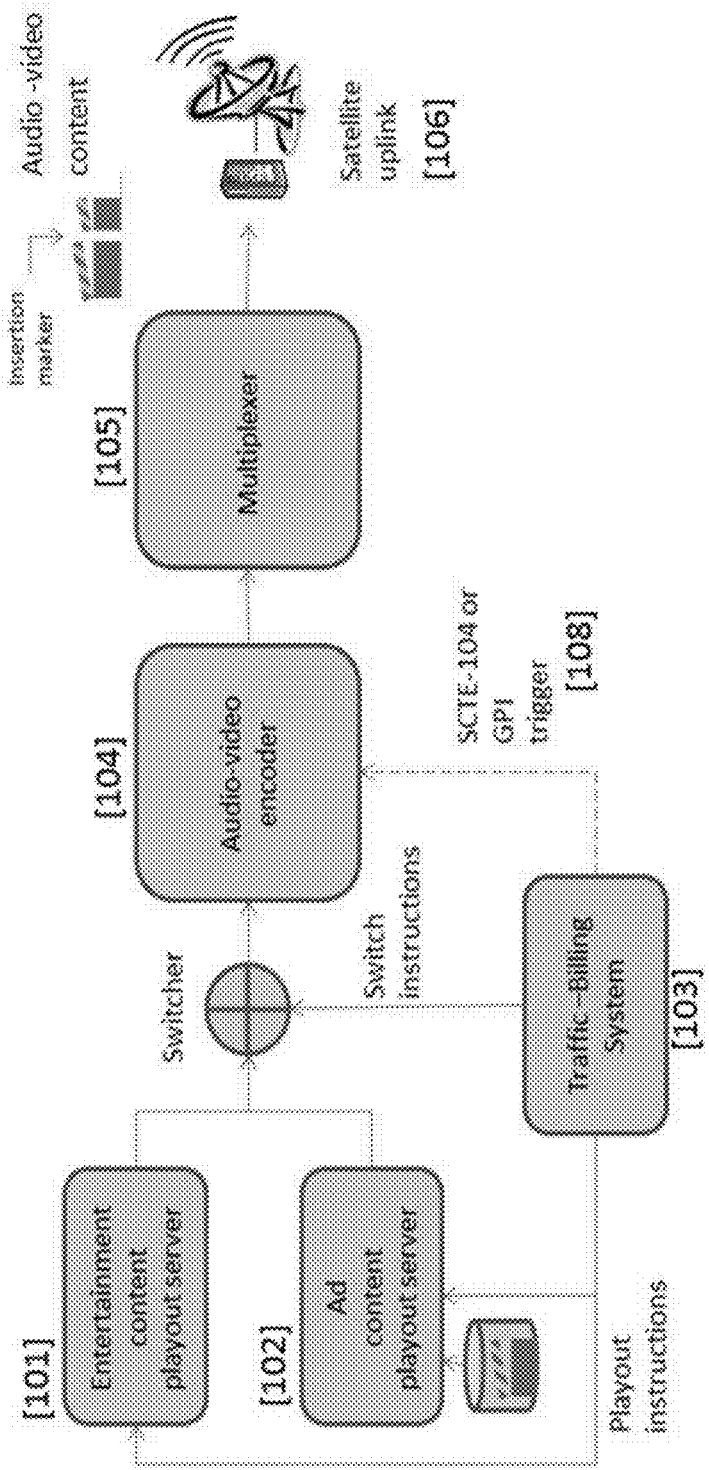
Fig 1 – Typical existing TV transmission system, supporting local content insertion

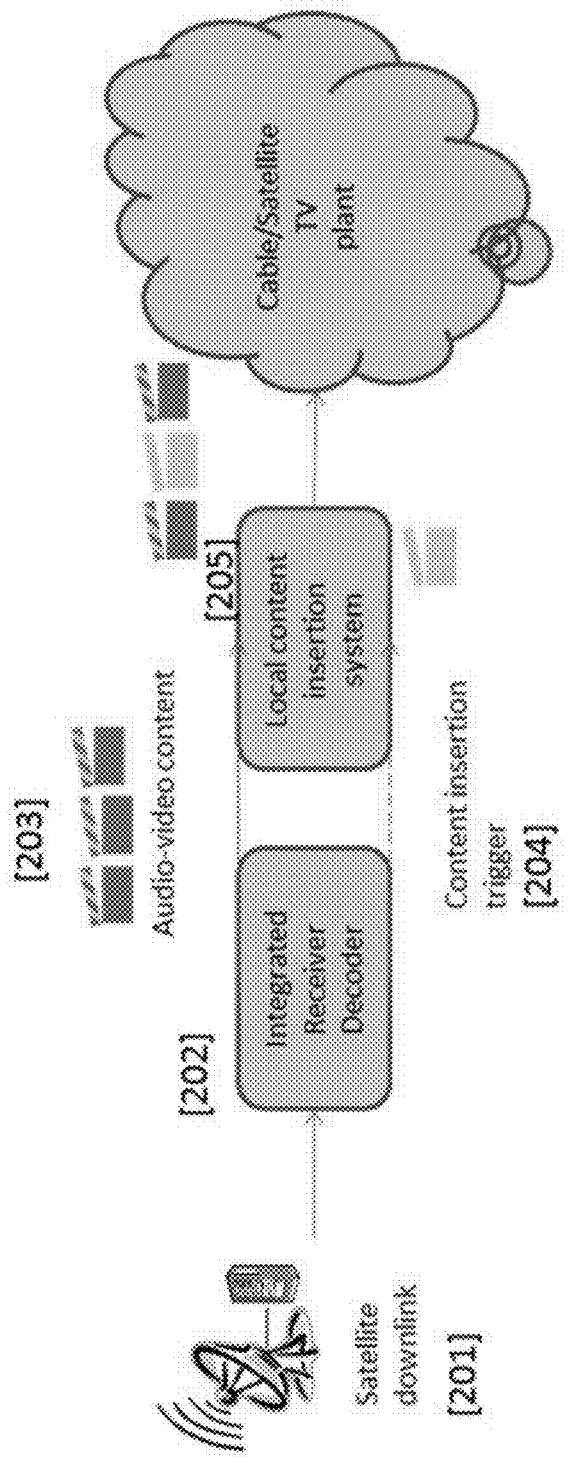
Fig 2 – Typical TV reception system, supporting local content insertion

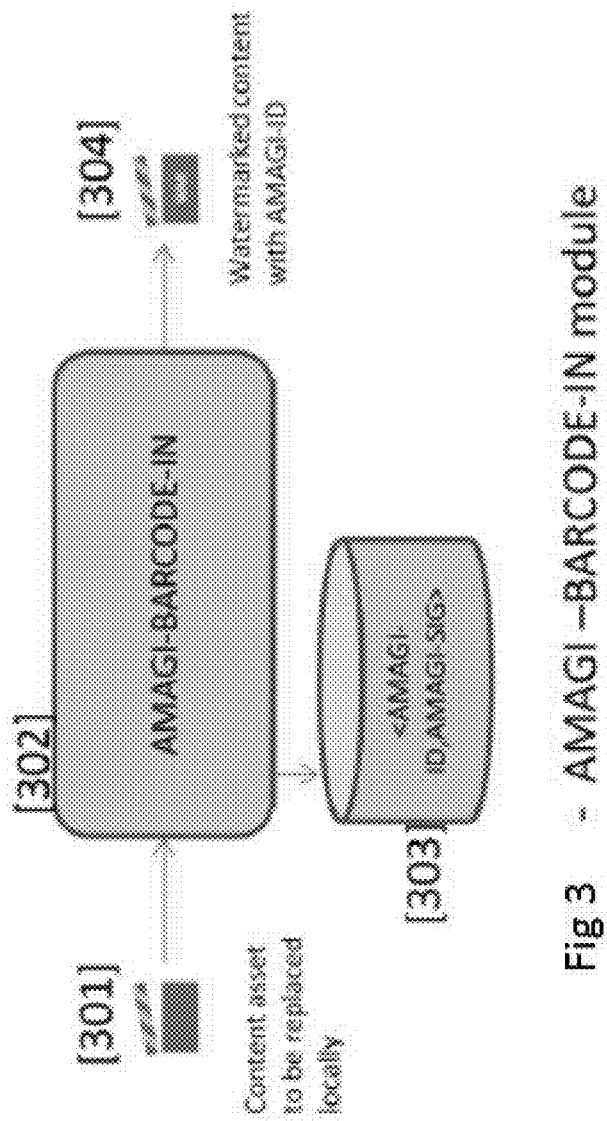

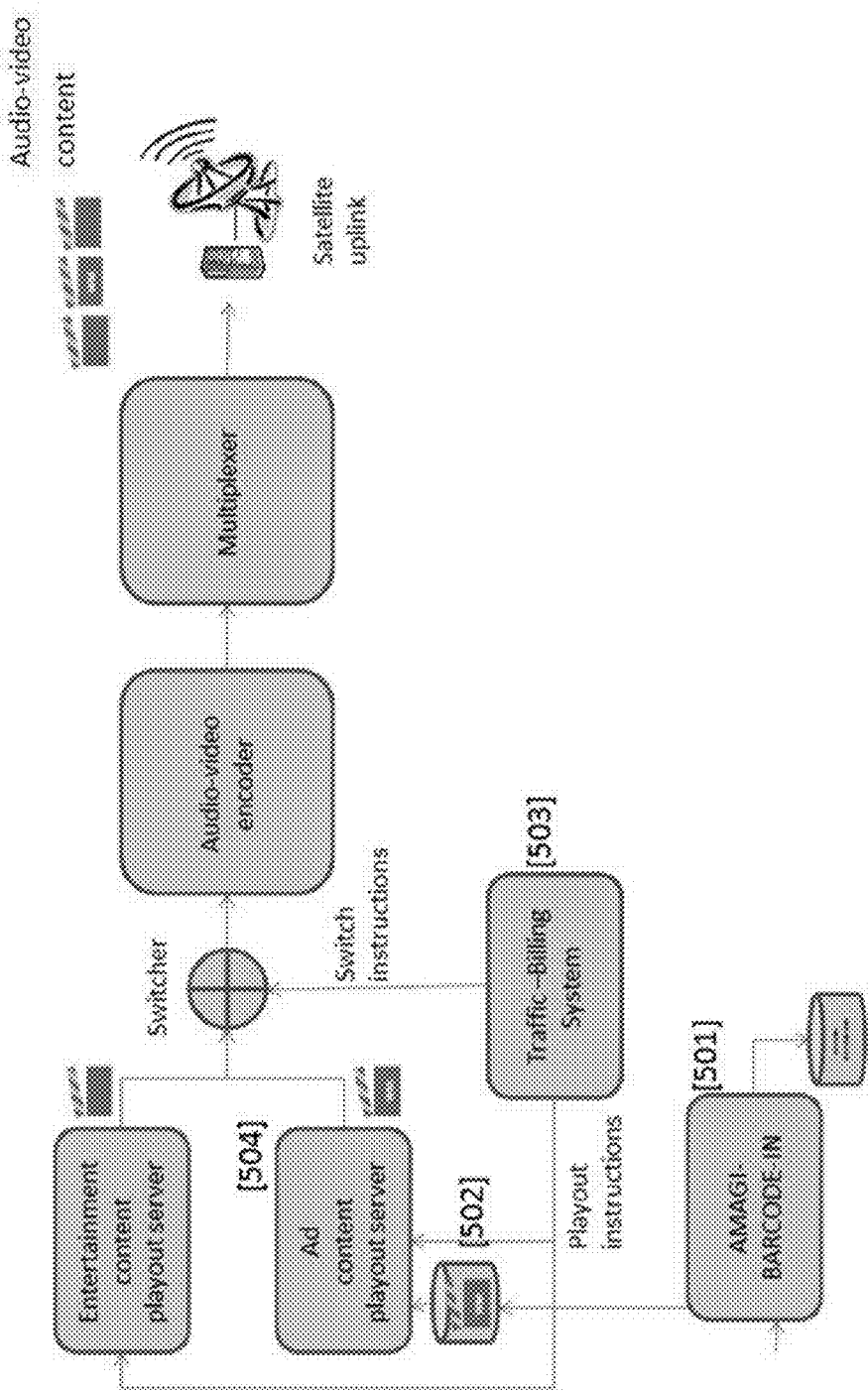
Fig 3a – TV transmission system with proposed method, supporting local content insertion

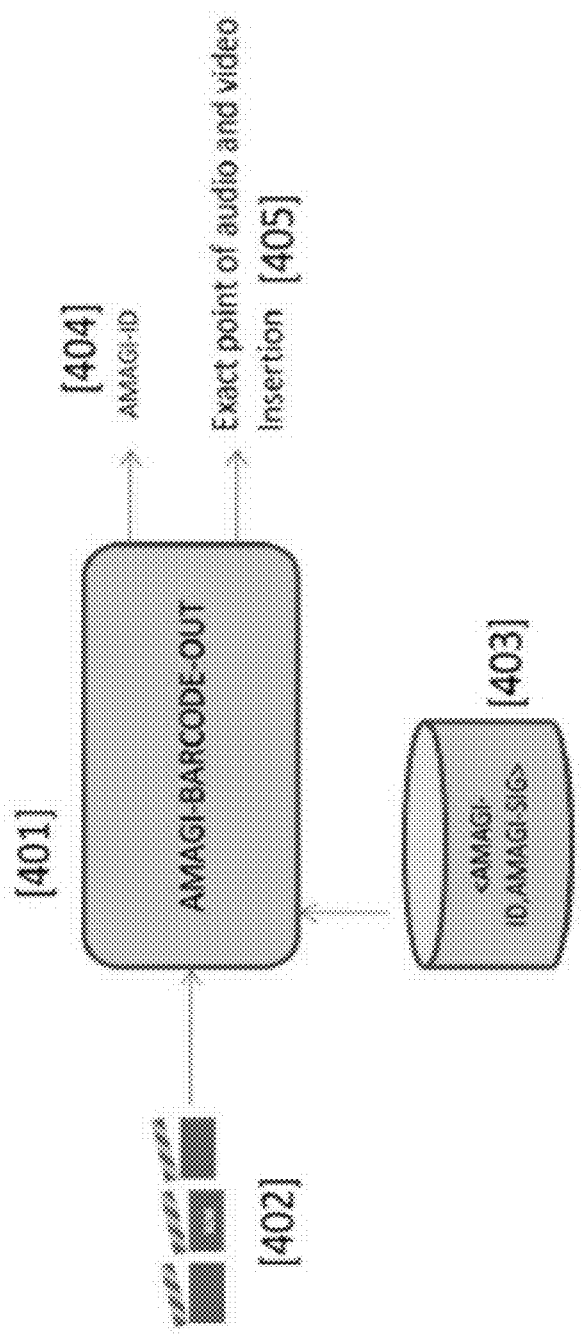
Fig 4 - AMAGI-BARCODE-OUT module

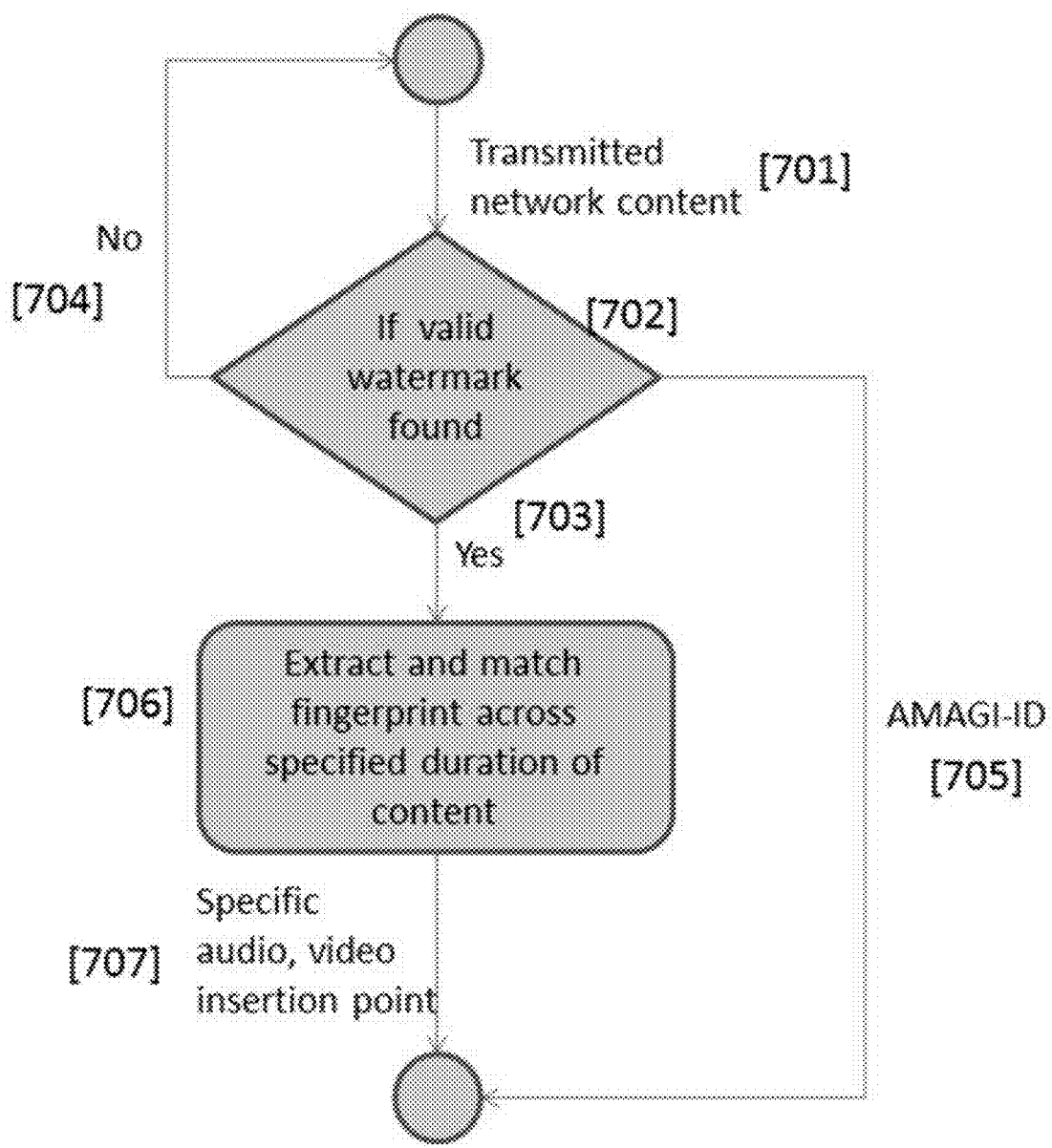
Fig 4a – AMAGI-BARCODE-OUT processing steps

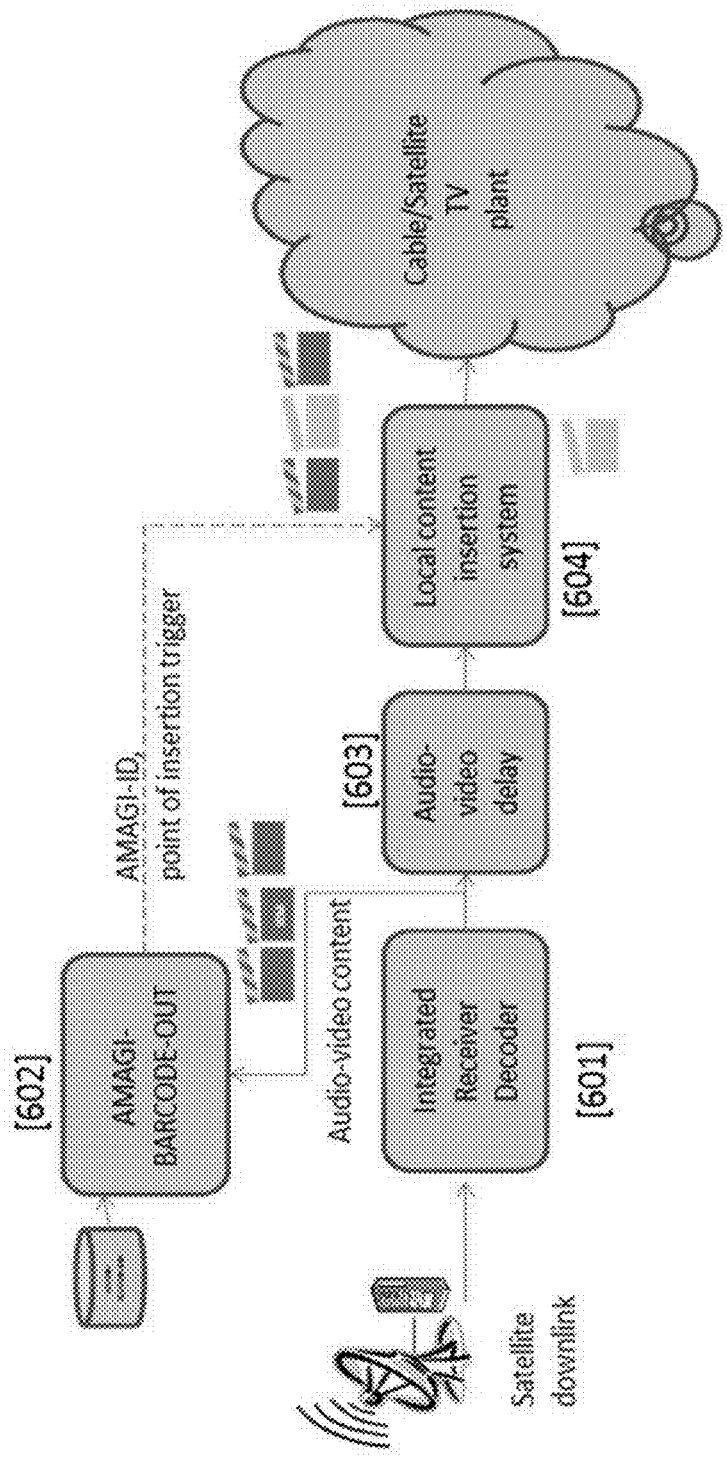
Fig 4b - Typical TV reception system with proposed method, supporting local content insertion

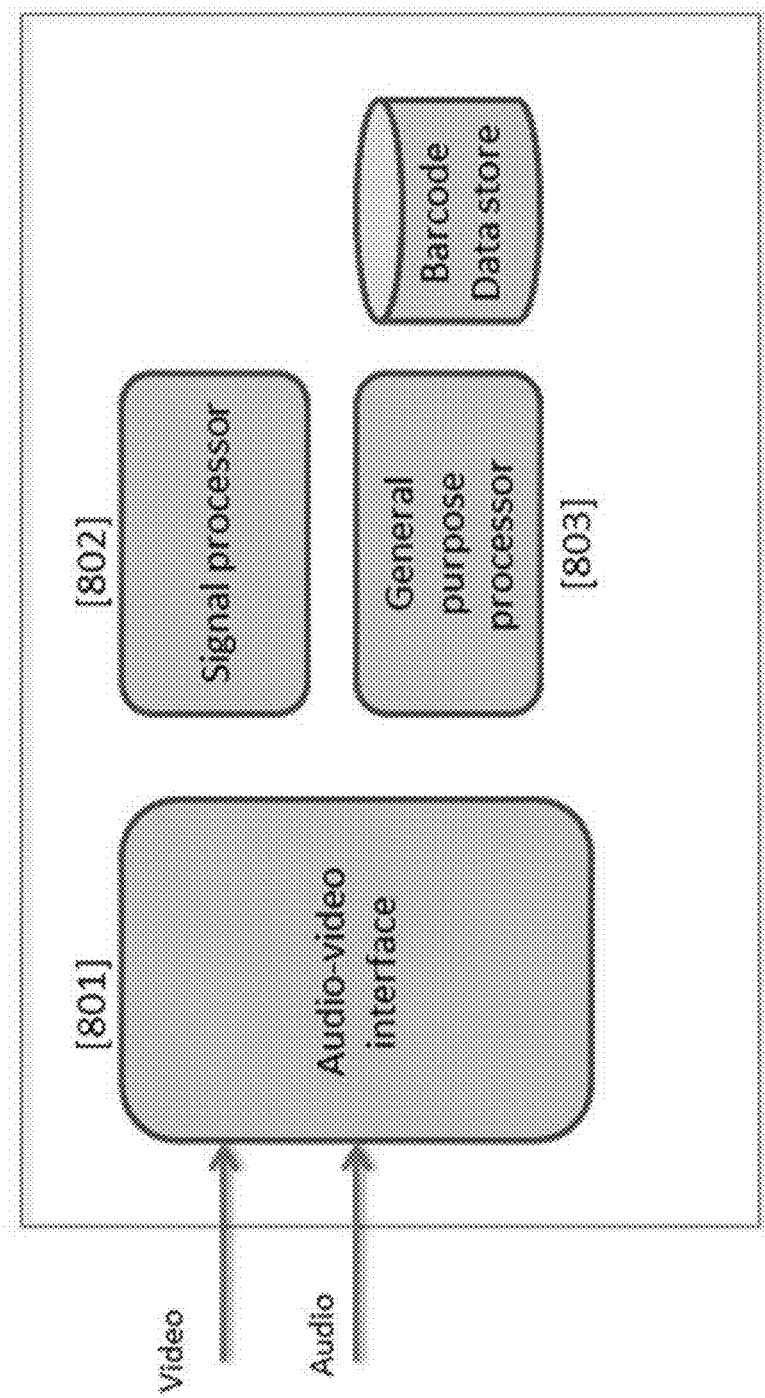
Fig 4c – AMAGI-BARCODE-OUT hardware diagram

SYSTEM AND METHOD FOR SEAMLESS CONTENT INSERTION ON NETWORK CONTENT USING AUDIO-VIDEO FINGERPRINTING AND WATERMARKING

STATEMENT OF RELATED APPLICATIONS

This patent application is based on and claims the benefit of U.S. Provisional Patent Application No. 61/506,853 having a filing date of 12 Jul. 2011.

BACKGROUND OF THE INVENTION

1. Field of the Invention

The present invention relates to a system and method for seamless content insertion on transmitted network content using audio-video fingerprinting and watermarking.

2. Prior Art

Local content insertion on network content is accomplished to address targeted ad insertion or local content in cable Multiple System Operator (MSO) headends, set-top boxes, and Internet browsers and in Internet content delivery networks. One application of local content insertion is targeted advertising wherein advertisements are placed to appeal to consumers or potential consumers, who are profiled based on demographics, besides a number of other variables. Advances in digital transmission technology enable new and improved methods for targeted advertising where advertisers can further verify the effectiveness of the ads and refine strategies utilizing quick feedback loops. Traditional broadcasting models where the same advertisement or content is seen by all users are slowly being replaced by local content insertion, to increase the spectrum of local advertisements. Amongst the first few advances in technology, video on demand (VOD) and switched digital video (SDV) enabled advertisers to customize content for specific groups of viewers. Introduction of feedback loops from the viewer's end, back to the headend, further enabled point-wise monitoring of user-preferences. Several standards have also been introduced during this evolution including that from the Society of Cable Telecommunications Engineers (SCTE), which define various standards for cable telecomm transmission systems. Advertising content is also changing simultaneously to include data tracks, over and above audio and video tracks in MPEG format [1].

In present-day systems, in order to identify the point of insertion, the network content that is streamed currently provides an out-of-band identification marker that determines the point of insertion that guarantees seamless local content insertion. This marker could be a Dual Tone Multi Frequency (DTMF) cue tone, an SCTE-35 message or an Adobe Flash ad insertion trigger. This marker is sent over the network from the source of transmission in an out-of-band manner synchronized with the point of insertion on the audio-video content. In these current systems there is a need to identify each point of insertion at the transmission source to identify and send relevant markers for the identified point of insertion.

WO 2006097825 discloses a system and method for household-targeted advertising wherein a Set Top Box (essentially housed at a consumer's premises) has targeted ads delivered to it, wherein the system is specifically programmed for an IP stack. In this patent, customised advertisements are delivered to a user by pulling on demand from a media storage device using SCTE-35 cues.

US2006075449 discloses a distributed architecture for digital program insertion in video streams delivered over packet networks wherein a head-end unit inserts Internet Protocol (IP) splice points into a digital video transport stream, which is embedded with cue tone signals. By using a splicing device downstream, this invention later inserts a specific ad at the splice points inserted by the head-end to customise the content based on demographic information.

US2005015816 discloses a system and method of providing triggered event commands via digital program insertion splicing wherein a DVS380 compliant message which is extracted to determine the point at which local content is inserted.

In these works of prior art, a complex workflow is implicit when there are hundreds of advertising content planned for local replacements across different points of insertion. In addition, the replacement of local content is predicated by the need for the marker, in several incompatible formats across transmission systems, to be inserted by the transmission source, which entails the need for the transmission business to participate in this ecosystem of local content insertion. This requirement renders present day systems top-heavy and unrealistic in the long term besides demonstrating no potential for increasing the spectrum of local ads as the methods to insert them seamlessly do not exist.

There are systems available in the market that uses audio-video fingerprinting only to effect local content insertion like DVEO's Gen2 ad insertion system and patent applications like "Video Detection and Insertion", by Konig; Richard (US), et al. The key problem with these systems is the ability to uniquely identify content assets to be replaced. Given that there can be multiple content assets with long duration of content remaining the same, to identify unique assets using fingerprints warrants capturing and matching the fingerprints for a duration longer than the anticipated duration of same audio-video content, in non-unique content assets. This leads to a limitation of the system to anticipate and design the workflow for the worst-case duration of same audio-video on non-unique content assets.

The present invention eliminates the need for any intervention on the transmission source for identifying the point of insertion. This is accomplished by using an in-band marker on the network content (also referred to as a network content asset) to be replaced, instead of out-of-band marker. This in-band marker is a combination of a watermark embedded into the content and fingerprints extracted from the content. The watermark that is embedded can be composed of audio or video or some combination of the two. At the point of local insertion, where a local content asset replaces the network content asset, the method and system of the present invention are able to uniquely identify the network content asset to be replaced and identify the specific point of insertion that guarantees seamless local content insertion, in real-time.

BRIEF SUMMARY OF THE INVENTION

The present invention proposes a system and method for seamless content insertion on network content by utilizing an in-band marker which is a combination of a watermark and a fingerprint that are used in conjunction to identify when and where to modify the main audio/video content. One of the applications of this invention is targeted advertising where local ads are placed to cater to customers from different demographics. By inserting a watermark, which is essentially a steganographic code, the present invention uniquely identifies content assets. A fingerprint is extracted for every content asset and further used to extract the salient features of the content, with high confidence and identify the exact point where the local content is to be inserted. The following terms are used in this specification:

1. Network Content Asset—This refers to the original content that was being transmitted or broadcast over a delivery network.
2. Local Content Asset—This refers to the customized content (for example, a local language advertisement to be transmitted during the break in the 7 pm news in one language in one state and another language in another state).
3. "AMAGI-ID"—This refers to the unique audio-video watermark that is inserted into the network content asset.
4. "AMAGI-WMED-CONTENT"—This refers to the watermarked network content asset.
5. "AMAGI-FP"—This refers to the fingerprint that is extracted from the network content asset.
6. "AMAGI-ID-DB"—This refers to a data store used in the present invention.
7. "AMAGI-BARCODE-IN"—This refers to a module that is introduced in the present invention, prior to content transmission.
8. "AMAGI-BARCODE-OUT"—This refers to a module that is introduced in the present invention, at the point of local content insertion or at a point in the transmission chain where the content and the point of insertion needs to be ascertained.

The present invention proposes a method and system for seamless content insertion of one or more local content assets, over one or more network content assets wherein a point of insertion is identified using an in-band marker constructed by a combination of an audio-video watermark and a unique fingerprint, used to customize content transmitted over one or more varied delivery networks, comprising the steps of:
   a. Embedding a unique network content asset identifier "AMAGI-ID" as an audio-video watermark, into the network content asset, the watermarked network content asset being labeled "AMAGI-WMED-CONTENT";
   b. Extracting a unique audio-video fingerprint "AMAGI-FP" from the network content asset;
   c. Storing "AMAGI-ID" and "AMAGI-FP" in a data store "AMAGI-ID-DB";
   d. Transmitting "AMAGI-WMED-CONTENT" over one or more networks in one or more content formats;
   e. Introducing a delay in the delivery of the network in order to identify the watermark and the fingerprint during network reception;
   f. Monitoring the network content assets at the time of reception to detect "AMAGI-WMED-CONTENT";
   g. Upon detecting previously inserted watermarks (in step a) in "AMAGI-WMED-CONTENT":
      i. Extracting the corresponding "AMAGI-ID" from the network content asset;
      ii. Extracting corresponding fingerprints for the network content asset;
      iii. Matching the extracted fingerprints obtained in step g(ii) with one or more previously stored "AMAGI-FP" in the "AMAGI-ID-DB";
      iv. Upon finding a match in step g(iii):
         a) Delivering the local content asset at the correct position in the stream of network content assets, thereby replacing the network content asset with a suitable local content asset.

The present invention removes the limitation of dependence on the head-end within the transmission ecosystem. Furthermore, the method and system of the present invention allows high-speed fingerprint extraction and matching, in order to minimize the time taken to provide a high-confidence, valid match to the point of insertion on both audio and video. The system does not impose specific fingerprinting or watermarking methods. There are multiple methods in public literature for fingerprinting [2] and for watermarking [3] that can be used as part of the proposed system.

BRIEF DESCRIPTION OF THE DRAWINGS

FIG. 1 illustrates the system of existing TV transmission, supporting local content insertion.
FIG. 2 illustrates the system of TV reception supporting local content insertion.
FIG. 3 illustrates AMAGI-BARCODE-IN module.
FIG. 3a illustrates a TV transmission system with proposed method supporting local content insertion alongside the AMAGI-BARCODE-IN module.
FIG. 4 illustrates AMAGI-BARCODE-OUT module.
FIG. 4a illustrates steps performed in the AMAGI-BARCODE-OUT module.
FIG. 4b illustrates a TV reception system with proposed method supporting local content insertion alongside the AMAGI-BARCODE-OUT module.
FIG. 4c illustrates the hardware modules within the AMAGI-BARCODE-OUT module.

DETAILED DESCRIPTION OF THE PREFERRED EMBODIMENTS

A typical TV network transmission that enables content insertion is described in FIG. 1. Entertainment content 101 and ad content playout servers 102 play their respective content, based on a playout schedule determined by the T&B (traffic and billing) systems 103. This content is passed through an audio-video encoder 104 and a multiplexer 105 before being up-linked onto a satellite 106, to be down-linked and distributed to subscriber homes. T&B systems know the exact playout duration and sequence of every content asset. For accomplishing local content insertion, the T&B system is programmed so as to initiate a trigger to identify the exact point of insertion based on playout schedule. This trigger is then encoded in time-sync with the content 107 and sent over the satellite. In the case of an analog transmission, it used to be a single audio tone. In case of digital content transmission, a plurality of options, either a DTMF (dual-tone multi-frequency) cue tones or SCTE-35 markers are used. The trigger from the T&B system 108 can either be a simple input trigger (GPI—General Purpose Input, programmed as a trigger), or could be a data-enabled message like SCTE-104. In a simple GPI, the position of insertion is identified, but no information is transmitted related to the content asset that is to be replaced. SCTE-104 standard allows for providing additional information related to the to be replaced content asset, its duration and any other information that the T&B system can communicate with the local content insertion system post the down-link of content.

A typical TV transmission downlink in a cable headend plant is shown in FIG. 2. At the cable or satellite TV headend, the content is down-linked 201 and passed through a receiver 202, which decrypts the content (if encrypted at transmission source) and optionally decoded to be processed by the cable or satellite TV plant. These receivers have features to extract a plurality of triggers sent from the transmission that is received time synchronized with the point of content insertion. The content 203 along with the trigger 204 is fed to additional systems that either do the local content insertion 205 or translate the trigger to be sent over the cable or satellite TV plant, time synchronized with the content, to edge devices where local content insertion is accomplished. To enable local ad content insertion in a TV transmission system, TV networks have to identify the specific ad content asset that the advertisers want to replace with local ad content. This is done in their T&B systems, where the intention of the advertiser is translated to a trigger to be sent to the encoders by the T&B system.

The present invention introduces two modules, AMAGI-BARCODE-IN that is exercised prior to content transmission, and AMAGI-BARCODE-OUT which is used either at the point of local content insertion or at a point in the transmission chain where the content and the point of insertion needs to be ascertained. Multiple video frames and audio samples within the content stream are analyzed in order to create high confidence during extraction. Since the present invention works in real-time and has to process the watermarks and fingerprints quickly, the challenge of creating a method that can ascertain content to be replaced with high-confidence alongside having a robust system, which can work interoperably with existing television transmission systems has to be overcome.

The AMAGI-BARCODE-IN module is described in FIG. 3. The content asset 301 that is expected to be replaced with local content is sent through the AMAGI-BARCODE-IN module. The AMAGI-BARCODE-IN 302 module embeds a unique content asset identifier (AMAGI-ID) as an audio-video watermark into the content asset.

An audio-video watermark is a mechanism of embedding information onto the audio-video content, using the content as the carrier channel. The key to a good watermark is that the embedding of information effects a minimal distortion in the audio, video of the content, which is invisible and inaudible to humans. In addition the information should survive different network transmission systems and compression/decompression of content and be able to reliably extract at the receiver end. In addition the module extracts a unique audio-video fingerprint (called AMAGI-FP) from the content asset and stores the same in a data store, AMAGI-ID-DB 303.

Audio-video fingerprint is a form of low complexity compression of audio and video for purpose of unique identification of the content, rather than near-exact reproduction. The fingerprinting method should be able to at low complexity extract unique features of audio and video into a pattern, which during reception can be extracted from the network content for matching with the already extracted pattern.

The content is watermarked with AMAGI-ID, the watermarked content being called AMAGI-WMED-CONTENT 304. AMAGI-WMED-CONTENT 304 that is out of the AMAGI-BARCODE-IN module, is further sent for transmission on a plurality of networks, in a plurality of different content formats.

FIG. 3b describes sample TV transmission system with the proposed methods as part of the system. Content asset that is to be replaced is passed through AMAGI-BARCODE-IN 501 to create AMAGI-WMED-CONTENT. This is then passed on to a TV network's content data store 502 in a plurality of content formats as needed by the TV network. T&B system 503 then schedules the playout of different content from its playout servers 504, including AMAGI-WMED-CONTENT based on a schedule. In the proposed method, there is no need for the T&B system to be aware of the existence of content to be replaced and hence the absence of need for identifying point of local content insertion in the transmitted content stream. AMAGI-WMED-CONTENT is treated as any other regular content going over the transmission stream.

FIG. 4 shows the AMAGI-BARCODE-OUT module 401 takes as input the transmitted content stream 402. The module looks for the embedded watermark in select content on the transmitted content stream. If the watermark is found, the AMAGI-BARCODE-OUT module extracts AMAGI-ID from the content. The AMAGI-BARCODE-OUT module 401 then extracts audio-video fingerprints from the transmitted content stream and tries to match these fingerprints with plurality of AMAGI-FPs of different content assets stored in AMAGI-ID-DB 403. We note that this data store was initially populated by the AMAGI-BARCODE-IN module. If a content asset's fingerprint is matched with one of the AMAGI-FPs (from the AMAGI-ID-DB 403), that fingerprint is used along with the content-asset's watermark to identify the position of insertion of local content. The module outputs AMAGI-ID 404 (uniquely identifying the content asset to be replaced) and the specific point of insertion 405 at specific points in the transmitted content stream, where the content asset is found in the stream.

FIG. 4a shows the sequence of steps performed in the AMAGI-BARCODE-OUT module as it works on parsing 702 the transmitted network content 701 until 704 a valid watermark is found 702. In the case of AMAGI-WMED-CONTENT coming through the network content stream, this module identifies it as a valid watermark 703, else no action is taken and it continues 704 to analyze the incoming stream. Once a valid watermark is found, it is extracted and returned as AMAGI-ID 705, the unique content asset identifier that was embedded as part of AMAGI-BARCODE-IN module.

In one possible embodiment, the watermark is extracted from both audio and video to identify with high confidence the existence of AMAGI-ID watermark. In another possible embodiment, the watermark is extracted from either one of audio or video. Once the availability of AMAGI-WMED-CONTENT is ascertained, the step of fingerprint extraction and matching 706 is executed to identify the point of insertion of audio and video. This is done by running the steps of matching across a set duration of content from the point of watermark identification. In one embodiment, the fingerprint matching is exercised across say −5 to +10 video frames, from the position of identification of the watermark. This provides the exact position of the point of insertion 707. In another possible embodiment, the module shall run two different fingerprint matching methods to identify different audio and video insertion points. In another possible embodiment, the module shall execute either one of audio or video fingerprint matching and use the point of insertion identified for either audio or video to estimate the point of insertion for both audio and video.

Given that the system works on analyzing audio-video content during AMAGI-BARCODE-OUT, it becomes imperative that the overall transmitted content is delayed at the point of analysis or further down the content flow, so as to enable specific insertion action based on analyzed content. In systems implementing the present invention, there shall be an audio-video delay element post the point of content analysis by AMAGI-BARCODE-OUT. The duration of delay in the transmission chain is determined by the maximum of (a) duration needed to extract the audio-video watermark and (b) duration needed to match extracted audio-video signature. The specific duration for each of these is determined by the specific watermarking and fingerprint matching methods that are implemented as part of the system. Watermarking methods are either using spread-spectrum, amplitude modulation or using quantization of signals. Fingerprinting methods use perceptual characteristics of the audio or video to extract a unique bit pattern that at best uniquely identifies the content. FIG. 4b illustrates a TV reception system with proposed method supporting local content insertion alongside the AMAGI-BARCODE-OUT module. In this system, the audio-video content from the receiver 601 is passed to AMAGI-BARCODE-OUT module 602 as well as to an audio-video delay module 603. The audio-video delay module is configured to delay the content stream to the extent needed by AMAGI-BARCODE-OUT to identify the content asset with the AMAGI-ID on the content stream as well as the specific point of insertion of local content. This delayed content stream is then sent to additional systems that either do the local content insertion 604 or translate the trigger to be sent over the cable or satellite TV plant, time synchronized with the content, to edge devices where local content insertion is accomplished.

The AMAGI-BARCODE-OUT module as described in FIG. 4c, is a specialized hardware module that hosts the methods for watermarking, fingerprinting and barcode matching methods. This hardware shall have interfaces to receive audio-video stream 801, signal processor for executing watermarking and fingerprint methods 802, and a general purpose processor for handling logic to match the extracted barcode with the stored candidate barcodes 803. The AMAGI-BARCODE-OUT hardware supports plurality of interfaces like SDI, HDMI, composite video and audio for receiving audio-video content stream in real-time.

It is to be noted that specific methods for (a) embedding and extracting of audio-video watermark and (b) extraction and matching of audio-video fingerprints are outside the scope of this invention and has no direct bearing on the proposed system. It is assumed that those skilled in this art shall be able to leverage a plurality of different methods to accomplish the same desired effect. It also to be noted that the proposed system is no way limited to watermarking and fingerprinting to be done on both audio and video. It is possible for the system to be implemented with a plurality of either audio, video or with both audio and video processing for watermarking and fingerprint matching.

All modules specified in this system are either standalone devices or can be part of another entity. In one possible implementation, the AMAGI-BARCODE-OUT module, the audio-video delay module and the local content insertion system can be part of one entity. Those skilled in this art can come up with multiple different module configurations to accomplish the same.

Those skilled in this art shall be able to appreciate the spirit of this invention and its application to one or more varied system implementations and transmission networks, including but not limited to TV content transmission. The system could also be used for content which is either only audio or only video or on different tracks of audio in multi-track audio-video content. This invention can also be applied to any of the other content transmission networks including the Internet. In an Internet content transmission network, by using AMAGI-BARCODE-IN method on selected content assets during content creation, the system allows for using AMAGI-BARCODE-OUT to identify the content asset and the point of insertion during unicast or multicast streaming to viewers. Using the approach, viewer-specific local content insertion can be done on streamed content that replace a generic content asset inserted during content insertion.

REFERENCES 1. http://www.cable360.net/ct/strategy/businesscases/Adaptive-Advertising-Definitions-Scenarios-and-Standards_21347.html.
2. "A Highly Robust Audio Fingerprinting System", by Jaap Haitsma et al.
3. "A Video Watermarking System for Broadcast Monitoring", by Jaap Haitsma et al.

What is claimed is:

1. A method for seamless content insertion of one or more local content assets, over one or more network content assets wherein a point of insertion is identified using an in-band marker constructed by a combination of an audio-video watermark and a unique fingerprint, used to customize content transmitted over one or more varied delivery networks, comprising the steps of:
   a) embedding a unique network content asset identifier "AMAGI-ID" as an audio-video watermark, into the network content asset, the watermarked network content asset being labeled "AMAGI-WMED-CONTENT";
   b) extracting a unique audio-video fingerprint "AMAGI-FP" from the network content asset;
   c) storing "AMAGI-ID" and "AMAGI-FP" in a data store "AMAGI-ID-DB";
   d) transmitting "AMAGI-WMED-CONTENT" over one or more networks in one or more content formats;
   e) introducing a delay in the delivery of the network in order to identify the watermark and the fingerprint during network reception;
   f) monitoring the network content assets at the time of reception to detect "AMAGI-WMED-CONTENT";
   g) upon detecting previously inserted watermarks (in step a) in "AMAGI-WMED-CONTENT":
      i) extracting the corresponding "AMAGI-ID" from the network content asset;
      ii) extracting corresponding fingerprints for the network content asset; and
      iii) matching the extracted fingerprints obtained in step g(ii) with one or more previously stored "AMAGI-FP" in the "AMAGI-ID-DB";
   h) upon finding a match in step g(iii):
      iv) delivering the local content asset at the correct position in the stream of network content assets, thereby replacing the network content asset with a suitable local content asset.

2. The method for seamless content insertion of one or more local content assets, over one or more network content assets using an in-band marker of claim 1, wherein:
   a) one or more watermarking methods using spread-spectrum, amplitude modulation or using quantization of signals, can be used;
   b) the watermark uses the network content asset as the carrier channel;
   c) the watermark effects minimal distortion in the audio and video within the network content asset; and
   d) the watermark is independent of the delivery networks, which might have different compression and/or decompression of the audio-video content, and yet the watermark is reliably transmitted.

3. The method for seamless content insertion of one or more local content assets, over one or more network content assets using an in-band marker of claim 1, wherein:
   a) one or more fingerprinting methods using perceptual characteristics of audio or video streams within one or more network content assets, can be used to extract a unique bit pattern that at best uniquely identifies the network content assets; and
   b) fingerprinting methods used utilize a hash function or a low complexity compression of audio and or video for the purpose of unique identification of the content, rather than near-exact reproduction.

4. The method for seamless content insertion of one or more local content assets, over one or more network content assets using an in-band marker of claim 1, wherein if the fingerprint extracted in step g(ii) match with a unique "AMAGI-FP" in "AMAGI-ID-DB", it is used along with the previously inserted watermark detected to identify the position of insertion of local content assets in the stream of network content assets and the steps of watermarking and fingerprinting can be performed interchangably.

5. The method for seamless content insertion of one or more local content assets, over one or more network content assets using an in-band marker of claim 1, wherein the delay introduced in step 1(e) is determined as the maximum value between:
   a) the duration elapsing during extraction of the audio-video watermark; and
   b) the duration elapsing during matching the extracted fingerprint.

6. The method for seamless content insertion of one or more local content assets, over one or more network content assets using an in-band marker of claim 1, wherein:
   a) an "AMAGI-BARCODE-IN" module performs steps a-d; and
   b) an "AMAGI-BARCODE-OUT" module performs steps f and g.

7. The method for seamless content insertion of one or more local content assets, over one or more network content assets using an in-band marker of claim 1, wherein the watermark is extracted from both audio and video of the network content asset or from either one of audio or video to identify the existence of "AMAGI-ID" watermark.

8. The method for seamless content insertion of one or more local content assets, over one or more network content assets using an in-band marker of claim 1, wherein the fingerprint matching is exercised across −5 to +10 video frames, from the position of identification of the watermark in order to obtain the exact position of the point of insertion.

9. The method for seamless content insertion of one or more local content assets, over one or more network content assets using an in-band marker of claim 1, wherein one or more fingerprint matching procedures to identify different audio and video insertion points.

10. The method for seamless content insertion of one or more local content assets, over one or more network content assets using an in-band marker of claim 1, wherein either one of audio or video fingerprint matching and use the point of insertion identified for either audio or video to estimate the point of insertion for both audio and video.

11. The method for seamless content insertion of one or more local content assets, over one or more network content assets using an in-band marker of claim 1, used in cable head-ends, set-top boxes, internet browsers and internet content delivery networks using audio-video fingerprinting and water marking with (a) "AMAGI-BARCODE-IN" module, (b) an entertainment content play out server, (c) an ad content play out server, (d) traffic-billing system, (e) one or more encoder or decoder, (f) "AMAGI-BARCODE-OUT" module and (g) cable and satellite TV plants configured to support a plurality of networks, in a plurality of content formats, further comprising the steps of:
   a) performing in the "AMAGI-BARCODE-IN" module the steps of:
      i) embedding a unique network content asset identifier "AMAGI-ID" as an audio-video watermark, into the network content asset, the watermarked network content asset being labeled "AMAGI-WMED-CONTENT";
      ii) extracting a unique audio-video fingerprint "AMAGI-FP" from the network content asset;
      iii) storing "AMAGI-ID" and "AMAGI-FP" in a data store "AMAGI-ID-DB"; and
      iv) transmitting "AMAGI-WMED-CONTENT" over one or more networks in one or more content formats;
   b) introducing a delay in the delivery of the network content assets in order to identify the watermark and the fingerprint during network reception;
   c) performing in the "AMAGI-BARCODE-IN" module the steps of:
      i) monitoring the network content assets at the time of reception to detect "AMAGI-WMED-CONTENT";
      ii) upon detecting previously inserted watermarks (in step a) in "AMAGI-WMED-CONTENT":
         a) extracting the corresponding "AMAGI-ID" from the network content asset;
         b) extracting corresponding fingerprints for the network content asset; and
         c) matching the extracted fingerprints obtained in step (b) with one or more previously stored "AMAGI-FP" in the "AMAGI-ID-DB";
      iii) upon finding a match in step (c(ii)c):
         d) delivering the local content asset at the correct position in the stream of network content assets, thereby replacing the network content asset with a suitable local content asset.

12. The method for seamless content insertion of one or more local content assets, over one or more network content assets using an in-band marker of claim 11, wherein:
   a) one or more watermarking methods using spread-spectrum, amplitude modulation or using quantization of signals, can be used;
   b) the watermark uses the network content asset as the carrier channel;
   c) the watermark effects minimal distortion in the audio and video within the network content asset; and
   d) the watermark is independent of the delivery networks, which might have different compression and/or decompression of the audio-video content, and yet the watermark is reliably transmitted.

13. The method for seamless content insertion of one or more local content assets, over one or more network content assets using an in-band marker of claim 11, wherein:
   a) one or more fingerprinting methods using perceptual characteristics of audio or video streams within one or more network content assets, can be used to extract a unique bit pattern that at best uniquely identifies the network content assets; and
   b) fingerprinting methods used utilize a hash function or a low complexity compression of audio and or video for the purpose of unique identification of the content, rather than near-exact reproduction.

14. The method for seamless content insertion of one or more local content assets, over one or more network content assets using an in-band marker of claim 11, wherein if the fingerprint extracted in step g(ii) match with a unique "AMAGI-FP" in "AMAGI-ID-DB", it is used along with the previously inserted watermark detected to identify the position of insertion of local content assets in the stream of network content assets and the steps of watermarking and fingerprinting can be performed interchangably.

15. The method for seamless content insertion of one or more local content assets, over one or more network content assets using an in-band marker of claim 11, wherein the delay introduced in step 1(e) is determined as the maximum value between:
   a) the duration elapsing during extraction of the audio-video watermark; and
   b) the duration elapsing during matching the extracted fingerprint.

16. The method for seamless content insertion of one or more local content assets, over one or more network content assets using an in-band marker of claim 11, wherein watermark is extracted from both audio and video of the network content asset or from either one of audio or video to identify the existence of "AMAGI-ID" watermark.

17. The method for seamless content insertion of one or more local content assets, over one or more network content assets using an in-band marker of claim 11, wherein the fingerprint matching is exercised across −5 to +10 video frames, from the position of identification of the watermark in order to obtain the exact position of the point of insertion.

18. The method for seamless content insertion of one or more local content assets, over one or more network content assets using an in-band marker of claim 11, wherein one or more fingerprint matching procedures can be used to identify different audio and video insertion points.

19. The method for seamless content insertion of one or more local content assets, over one or more network content assets using an in-band marker of claim 11, wherein either one of audio or video fingerprint matching and use the point of insertion identified for either audio or video to estimate the point of insertion for both audio and video.

20. The method for seamless content insertion of one or more local content assets, over one or more network content assets using an in-band marker of claim 11, wherein "AMAGI-BARCODE-IN" can be either of a standalone module or integrated as part of one or more pre-existing content play out, content editing, content post-production or content encoding devices.

21. The method for seamless content insertion of one or more local content assets, over one or more network content assets using an in-band marker of claim 11, wherein "AMAGI-BARCODE-OUT" can be either of a standalone module or integrated as part of one or more pre-existing content receiver, content insertion, content decoder, or content rendering devices.

22. The method for seamless content insertion of one or more local content assets, over one or more network content assets using an in-band marker of claim 1, used in Internet content transmission networks by using "AMAGI-BARCODE-IN" on selected internet content assets during content creation, such that "AMAGI-BARCODE-OUT" is used to identify the watermarked internet content asset along with the point of insertion during unicast or multicast streaming to viewers.

23. A system for seamless content insertion of one or more local content assets, over one or more network content assets using an in-band marker used in cable head-ends, set-top boxes, internet browsers and internet content delivery networks using audio-video fingerprinting and water marking with (a) "AMAGI-BARCODE-IN" subsystem, (b) an entertainment content play out server, (c) an ad content play out server, (d) traffic-billing system, (e) one or more encoder or decoder, (f) "AMAGI-BARCODE-OUT" subsystem and (g) cable and satellite TV plants configured to support a plurality of networks, in a plurality of content formats, wherein:
  a) the "AMAGI-BARCODE-IN" subsystem is configured to:
    i) embed a unique network content asset identifier "AMAGI-ID" as an audio-video watermark, into the network content asset, the watermarked network content asset being labeled "AMAGI-WMED-CONTENT";
    ii) extract a unique audio-video fingerprint "AMAGI-FP" from the network content asset;
    iii) store "AMAGI-ID" and "AMAGI-FP" in a data store "AMAGI-ID-DB";
    iv) transmit "AMAGI-WMED-CONTENT" over one or more networks in one or more content formats;
  b) a delay is introduced in the delivery of the network content assets in order to identify the watermark and the fingerprint during network reception;
  c) the "AMAGI-BARCODE-IN" subsystem is configured to:
    i) monitor the network content assets at the time of reception to detect "AMAGI-WMED-CONTENT";
    ii) upon detecting previously inserted watermarks (in step a) in "AMAGI-WMED-CONTENT":
      a) extract the corresponding "AMAGI-ID" from the network content asset;
      b) extract corresponding fingerprints for the network content asset; and
      c) match the extracted fingerprints obtained in step (b) with one or more previously stored "AMAGI-FP" in the "AMAGI-ID-DB";
    iii) upon finding a match in (c(ii)c) the local content asset is delivered at the correct position in the stream of network content assets, thereby replacing the network content asset with a suitable local content asset.

24. The system for seamless content insertion of one or more local content assets, over one or more network content assets using an in-band marker of claim 23, wherein:
  a) one or more watermarking methods using spread-spectrum, amplitude modulation or using quantization of signals, can be used;
  b) the watermark uses the network content asset as the carrier channel;
  c) the watermark effects minimal distortion in the audio and video within the network content asset; and
  d) the watermark is independent of the delivery networks, which might have different compression and/or decompression of the audio-video content, and yet the watermark is reliably transmitted.

25. The system for seamless content insertion of one or more local content assets, over one or more network content assets using an in-band marker of claim 23, wherein:
  a) one or more fingerprinting methods using perceptual characteristics of audio or video streams within one or more network content assets, can be used to extract a unique bit pattern that at best uniquely identifies the network content assets; and
  b) fingerprinting methods used utilize a hash function or a low complexity compression of audio and or video for the purpose of unique identification of the content, rather than near-exact reproduction.

26. The system for seamless content insertion of one or more local content assets, over one or more network content assets using an in-band marker of claim 23, wherein if the fingerprint extracted in step g(ii) match with a unique "AMAGI-FP" in "AMAGI-ID-DB", it is used along with the previously inserted watermark detected to identify the position of insertion of local content assets in the stream of network content assets and the steps of watermarking and fingerprinting can be performed interchangably.

27. The system for seamless content insertion of one or more local content assets, over one or more network content assets using an in-band marker of claim 23, wherein the delay introduced is determined as the maximum value between:
  a) the duration elapsing during extraction of the audio-video watermark; and
  b) the duration elapsing during matching the extracted fingerprint.

28. The system for seamless content insertion of one or more local content assets, over one or more network content assets using an in-band marker of claim 23, wherein the watermark is extracted from both audio and video of the network content asset or from either one of audio or video to identify the existence of "AMAGI-ID" watermark.

29. The system for seamless content insertion of one or more local content assets, over one or more network content assets using an in-band marker of claim 23, wherein:
   a) the fingerprint matching is exercised across −5 to +10 video frames, from the position of identification of the watermark in order to obtain the exact position of the point of insertion;
   b) one or more fingerprint matching procedures are used to identify different audio and video insertion points; and
   c) either one of audio or video fingerprint matching and use the point of insertion identified for either audio or video to estimate the point of insertion for both audio and video.

30. The system for seamless content insertion of one or more local content assets, over one or more network content assets using an in-band marker of claim 23, wherein:
   a) the "AMAGI-BARCODE-IN" can be either of a standalone module or integrated as part of one or more pre-existing content play out, content editing, content post-production or content encoding devices; and
   b) the "AMAGI-BARCODE-OUT" can be either of a standalone module or integrated as part of one or more pre-existing content receiver, content insertion, content decoder, or content rendering devices.

* * * * *